May 24, 1938.　　C. V. McINTIRE ET AL　　2,118,096
CARBURETED WATER GAS SET
Filed Sept. 17, 1936
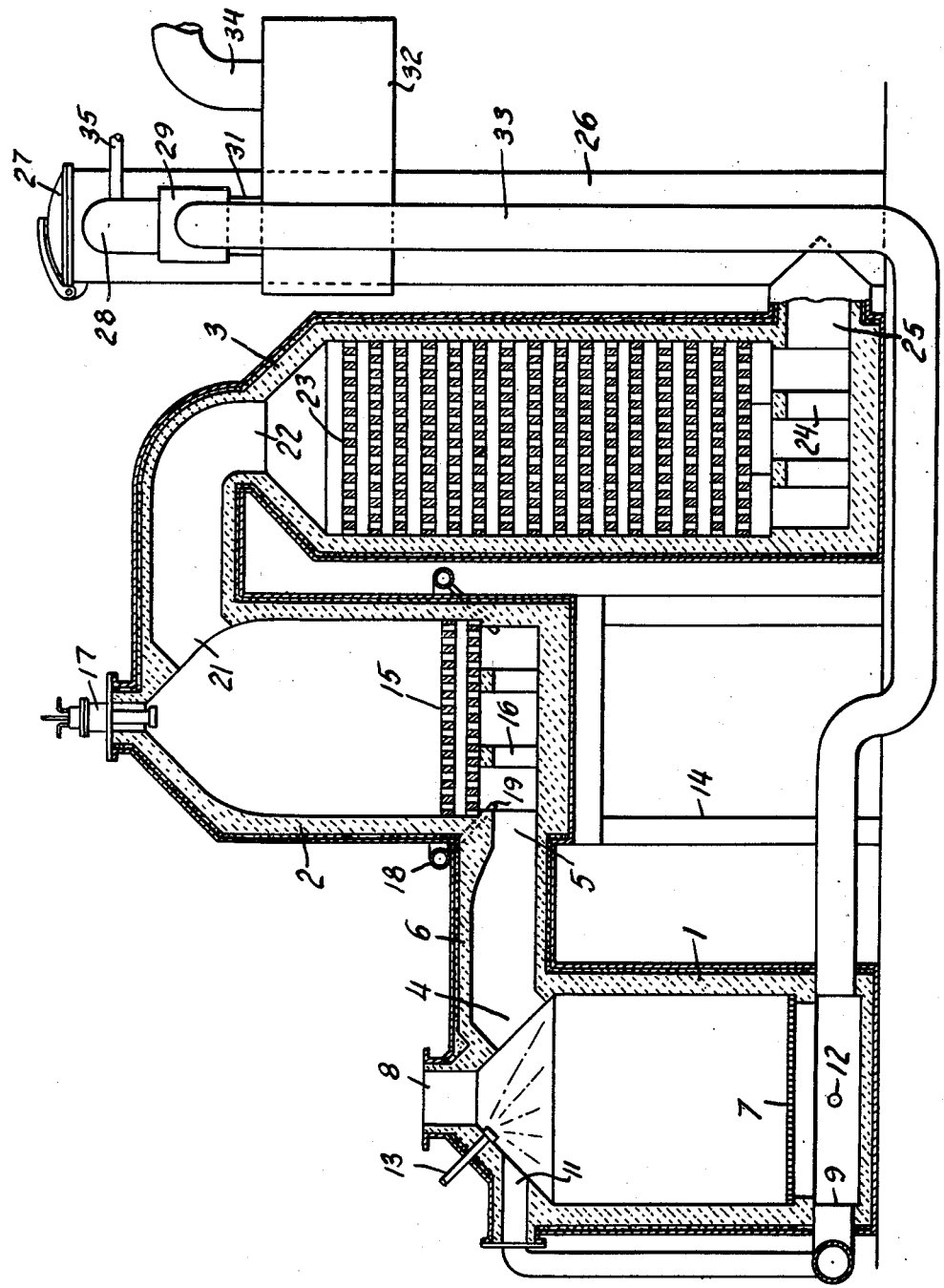
INVENTORS
William Tiddy
Charles V. McIntire
BY
ATTORNEY Patented May 24, 1938

2,118,096

UNITED STATES PATENT OFFICE 2,118,096

CARBURETED WATER GAS SET

Charles V. McIntire, Short Hills, N. J., and William Tiddy, New York, N. Y., assignors to Semet-Solvay Engineering Corporation, New York, N. Y., a corporation of New York Application September 17, 1936, Serial No. 101,238

4 Claims. (Cl. 48—80)

This invention relates to apparatus for making carbureted water gas, and more particularly to novel and improved backrun water gas apparatus.

Existing backrun water gas sets are usually constituted of a generator, carburetor, and superheater located in separate and detached shells, and connected in series, the bases of these three shells resting on the same operating floor, i. e., being disposed in the same horizontal plane. The generator and carburetor are of substantially the same size, and the top of the generator communicates with the top of the carburetor. The superheater is substantially higher than the carburetor and has its base communicating with the base of the carburetor. The top of the superheater is connected with a wash box into which leads the backrun line from the generator. Oil is admitted to the carburetor at the top thereof in a direction concurrent with the flow of water gas therethrough.

In such backrun equipment and in the conventional up and down run water gas sets which have been used for a great number of years prior to the development of the backrun, flow of blast gases and water gas takes place downwardly through the carburetor and upwardly through the superheater. The function of the superheater, as is well known, is to fix the carbureted water gas flowing therethrough. As pointed out by Professor Trinks in his book on Industrial Furnaces, page 367, published by John Wiley & Sons, "The rule is that a gas which is being heated must ascend while a gas which is being cooled must descend." In the present existing backrun carbureted water gas equipment and in the up and down run water gas equipment, flow of blast gases takes place upwardly through the superheater, resulting in non-uniform heating thereof. In the subsequent carbureted water gas making steps flow of carbureted water gas to be fixed in such equipment takes place upwardly in a non-uniformly heated superheater; whereas with the downward flow of gases through a uniformly heated superheater, in accordance with this invention, due to correct distribution of blast gases in the superheater, uniform heating of the checkerbrick in the superheater takes place and the uniformly heated checkerbrick or contact surfaces are utilized in fixing the carbureted water gas so that more efficient fixing results.

It is an object of this invention to provide a backrun carbureted water gas set of improved design which retains the advantageous features of size and proportions of the units of the well-known carbureted water gas sets but in which flow of gases through the carburetor and superheater, and oil introduced into the carburetor, are in directions which give optimum oil cracking and heat utilization efficiencies in the production of carbureted water gas. It is a further object to provide a carbureted water gas set in the carburetor of which heavy oil such as Bunker C oil can efficiently be used as the carbureting medium. Other objects and features of the invention will be made evident as the description progresses.

In accordance with this invention, the generator, carburetor and superheater, preferably of conventional size, are connected so that the top of the generator communicates with the base of the carburetor, and the top of the carburetor with the top of the superheater. The base of the carburetor is elevated so that it is substantially in alignment with the top gas outlet from the generator. The carburetor has a few, two or more, layers of heat storing refractory brick work at the base thereof and the remainder unobstructed throughout the horizontal cross-sectional area thereof. An oil inlet is disposed at the top of the carburetor for introducing oil which may be heavy oil in a direction countercurrent to the upward flow of water gas through the carburetor. The superheater has checkerbrick occupying substantially the entire volume thereof and defining a single pass for flow of gas therethrough. A stack leads from the base of the superheater and extends to a point well above the top of the superheater. The backrun line leads from the bottom of the generator to a wash box which also communicates with a gas offtake from the stack. The generator is provided with inlets for steam and heavy oil. Secondary or scurfing air inlets may be located in the carburetor. A steam inlet is preferably disposed at the top of the stack for admitting backrun steam to the set.

The backrun water gas sets of this invention possess among others, the following advantages over existing equipment:

During the blasting cycle, the heat storing refractory material at the base of the carburetor causes immediate ignititon of the blast gases as they enter the carburetor. Moreover, this heat storing refractory material at the bottom of the carburetor causes thorough mixing of the blast gas and secondary air and the distribution of the gases flowing through the carburetor uniformly throughout the cross-sectional area thereof. The gases burn and flow upwardly through the carburetor resulting in the bottom of the carburetor being heated to the highest temperature, i. e., the temperature gradient in the carburetor is from bottom to top, the reverse of that in existing carburetors. The burning blast gases enter the top of the superheater and flow downwardly therethrough. As these hot gases are lighter than air, they have a tendency to rise against the flow direction, and accordingly channelling within the superheater is completely eliminated, thus insuring better distribution of gases and heat transfer between the blast gases and the checkerbrick in the superheater. For a given size superheater, therefore, other conditions being the same, the blast gases leave the superheater at a lower temperature as compared with the temperature of the exit blast gases in existing equipment.

During the uprun, the water gas leaving the generator passes over the refractory brickwork at the bottom of the carburetor before coming in contact with the atomized oil introduced into the carburetor. Since, as above indicated, the base of the carburetor is the hottest part thereof, the entering water gas may be further heated prior to admixture with the oil. The oil is fogged or atomized at the top of the carburetor in a direction of flow countercurrent to the water gas passing up therethrough. The portion of the oil which is not immediately gasified upon introduction into the carburetor, passes down through the carburetor, continually entering into a new zone of the carburetor which is at a progressively higher temperature, until the oil is completely gasified. This method of oil gasification insures maximum oil efficiencies.

The carbureted water gas passes from the top of the carburetor into the top of the superheater downwardly through the uniformly heated checkerbrick therein. The connection between the carburetor and superheater leading into the top of the superheater should preferably be disposed coaxial with the axis of the superheater, thereby giving better distribution of the gas throughout the superheater. Since the carbureted water gas flows downwardly through the uniformly heated superheater, it is most efficiently fixed by the hot checkerbrick over which it passes.

Using heavy oil as a carbureting medium, the carbon settling at the base of the carburetor is deposited on the refractory brickwork. During a succeeding blasting cycle, this carbon deposit can be completely burned by excess secondary air introduced into the carburetor, or by scurfing air introduced thereinto since the carbon resting on the brickwork at the base of the carburetor where the temperature is highest will be extremely hot and in a thin layer. Hence, the carburetor will be kept free of excessive carbonaceous deposits, and the heat generated by the combustion of carbon will assist in bringing the temperature of the carburetor to the required point.

During the backrun, steam introduced into the stack is preheated as it flows through the stack, superheater and carburetor, restoring heat to the generator fuel bed. With heavy oil carburetion, the carbon remaining on the checkerbrick at the bottom of the carburetor, which is, as above indicated the hottest point in the carburetor, will, to a large extent, be consumed by the superheated steam to form water gas.

The arrangement of stack and single pass superheater, in effect, constitutes a U system in which the flow of hot gases will be towards the longer outer leg of the U preventing "back draft" in the set when it is idle and in standby position with consequent elimination of explosive hazards due to the formation of explosive mixtures of air and combustible gas. With a stack shorter than the superheater, there would be a tendency for the longer inner leg, i. e., the superheater, to draw air thereinto resulting in accumulation of explosive gas mixtures in the set.

The design of the carburetor and the connections between it and the generator and superheater substantially reduce, if not completely eliminate, the possibilities of blown over fuel being carried into the superheater where it would plug the checkerbrick therein.

In conventional carbureted water gas equipment in which gas flows downwardly through the carburetor, blown over fuel is carried from the carburetor into the superheater. In the apparatus of this invention, in which flow takes place upwardly through the carburetor, blown over fuel tends to settle at the bottom of the carburetor where it can be burned during the blasting cycle. The refractory material at the base of the carburetor is so designed that blown over fuel settling thereon does not interfere with the flow of gas through the carburetor. In the superheater, however, the usual checkerbrick is employed to insure effective heat utilization in fixing the carbureted water gas which checkerbrick would soon be clogged with blown over fuel if carried thereinto as in the case of existing equipment.

The superheater design, it will be noted, permits ready changing of the checkerbrick at the inlet end, where the checkers require most frequent replacement since the inlet portion of the superheater is subjected to the highest temperatures and most severe conditions of operation. In conventional superheaters in which flow takes place in an upward direction, in order to replace the bricks at the inlet end of the superheater, it is necessary to remove the complete body of checkerbrick therewithin. In the superheater of this invention, it will be noted the upper layers of checkerbrick can be removed without disturbing the remaining brick.

The single figure of the accompanying drawing forming a part of this specification shows for purposes of exemplification a vertical section through a preferred backrun carbureted water gas set embodying this invention. It will be understood, however, that the invention is not limited to the set illustrated.

Referring to the drawing in which the like reference characters indicate like parts, there is shown a water gas set comprising a generator 1, carburetor 2, and superheater 3. The carburetor is elevated so that its base is substantially in the same horizontal plane with the outlet 4 of the generator. Outlet 4 of the generator communicates with the inlet 5 to the carburetor by a refractory lined passageway 6. Generator 1 is equipped with the usual grate 7 for supporting a body of fuel such as a coal or coke. This generator has a fuel charging opening 8 adapted to be closed by a suitable closure, not shown, and is equipped with air inlets 9 and 11 disposed beneath the grate and above the top of the fuel bed respectively. The generator 1 has steam inlet 12 disposed beneath the grate for supplying steam thereto. An oil spray 13 leads into the top of the generator above the fuel bed to supply oil, which may be heavy oil such as Bunker C oil, during the gas making step if desired.

The carburetor 2 rests on suitable structural steel support 14 and is provided at its base with two or more layers of refractory material 15 disposed on arches 16 positioned at the bottom of the carburetor. Refractory material 15 may be checkerbrick or other refractory providing relatively large openings so as to avoid clogging thereof by fuel blown over from the fuel bed. The portion of the carburetor above the checkerbrick 16 is unobstructed throughout its horizontal cross sectional area. A water cooled oil spray 17 is disposed at the top of the carburetor, preferably on the vertical axis thereof, and is arranged to supply oil which may be heavy oil such as Bunker C oil to the carburetor during the water gas making steps in a direction countercurrent to the upward flow of water gas through the carburetor. A header 18 provided with downwardly directed pipes 19 is arranged to supply secondary air to the base portion of the carburetor. The top of the carburetor has a gas outlet 21 leading into the top of the superheater 3.

The superheater 3 has a circular inlet 22, the center of which is disposed to coincide with the longitudinal axis of the superheater. Inlet 22 of the superheater and outlet 21 of the carburetor, as above indicated, are connected by a refractory lined passageway which, as shown in the drawing, permits unobstructed flow of gas from the carburetor into the superheater. Checkerbrick 23, which may be of the type disclosed and claimed in United States Patent No. 1,927,834, granted September 26, 1933, completely fills the superheater 3 and rests on arches 24 disposed at the base of the superheater. Gas outlet 25 of the superheater leads into a vertical refractory lined stack 26 provided with a suitable stack valve 27. This stack is of a height somewhat greater than the height of the superheater so that, as shown in the drawing, stack valve 27 is disposed above the top of the superheater and constitutes the highest point of the set.

A conduit 28 leads from a point near the top of the stack 26 into a valve casing 29 which in turn communicates by a pipe 31 with a wash box 32. Backrun line or conduit 33 leads from the base of the generator beneath the grate into valve casing 29. The valve casing 29, as well known in this art, is provided with a three-way valve for reversing flow through the set, i. e., in one position it permits flow of uprun gas from the superheater into washbox 32, while closing the backrun pipe 33 and, when reversed, opens backrun line 33 so as to permit flow of backrun gas therethrough into the washbox while closing conduit 28. A gas offtake 34 leads from the washbox to the usual purification equipment.

Backrun steam inlet 35 is provided for supplying steam to the top of the stack which, as above indicated, communicates with the superheater.

It will be noted the apparatus of this invention, while retaining the advantageous relative sizes of individual generator, carburetor and superheater units which have in practice proved most effective in the manufacture of water gas, provides a novel arrangement of these units and changes in the structure thereof so that flow of gas making fluids and gas takes place in directions and under conditions resulting in optimum heat utilization with consequent savings in generator fuel and oil costs per unit volume of gas generated.

What is claimed is:

1. A carbureted water gas set comprising a single generator adapted to contain a bed of fuel, a single carburetor and a single superheater containing checkerbrick, located in separate and detached shells and connected in series with the top of the generator communicating with the base of the carburetor and the top of the carburetor communicating with the top of the superheater, so that during the blasting and water gas making steps flow of blast and water gas respectively takes place from the generator up through the carburetor and down through the superheater, thereby uniformly heating the checkerbrick in the superheater during the blasting step and efficiently fixing the carbureted water gas during the gas making step, the generator and carburetor being of substantially the same height and the superheater being of substantially greater height than the generator or the carburetor, the carburetor being elevated so that its base is substantially in alignment with the gas offtake at the top of the generator, the carburetor having an oil inlet disposed to introduce oil in a downward direction into the upwardly flowing stream of water gas passing through the carburetor during the water gas making step, and a stack leading from the base of the superheater and extending to a height greater than the height of the superheater.

2. A carbureted water gas set comprising a generator, carburetor and superheater located in separate and detached shells, having the top of the generator communicating with the base of the carburetor and the top of the carburetor communicating with the top of the superheater so that flow takes place up through the carburetor and down through the superheater, the generator and carburetor being of substantially the same height and the superheater being of substantially greater height than the generator or the carburetor, the carburetor being elevated so that its base is substantially in alignment with the gas offtake at the top of the generator, the carburetor having an oil inlet at its top and heat storing refractory material at its base occupying a minor portion of the volume thereof, leaving the remaining major portion unobstructed throughout the horizontal cross-sectional area thereof, and the superheater having checkerbrick therein defining a single pass for flow of gas therethrough.

3. A carbureted water gas set comprising a generator, carburetor and superheater located in separate and detached shells, having the top of the generator communicating with the base of the carburetor and the top of the carburetor communicating with the top of the superheater so that flow takes place up through the carburetor and down through the superheater, the generator and carburetor being of substantially the same height and the superheater being of substantially greater height than the generator or the carburetor, the carburetor being elevated so that its base is substantially in alignment with the gas offtake at the top of the generator, the carburetor having an oil inlet at its top disposed coincident with the longitudinal axis of the carburetor and having heat storing refractory material therein at its base occupying a minor portion of the volume of the carburetor leaving the remaining major portion unobstructed throughout the horizontal cross-sectional area thereof, the superheater having a top inlet co-axial with the axis thereof and having checkerbrick therein defining a single pass for flow of gas therethrough, and a stack leading from the base of the superheater and extending to a height greater than the height of the superheater.

4. A carbureted water gas set comprising a generator, carburetor and superheater located in separate and detached shells, having the top of the generator communicating with the base of the carburetor and the top of the carburetor communicating with the top of the superheater so that flow takes place up through the carburetor and down through the superheater, the generator and carburetor being of substantially the same height and the superheater being of substantially greater height than the generator or the carburetor, the carburetor being elevated so that its base is substantially in alignment with the gas offtake at the top of the generator, the carburetor having an oil inlet at its top disposed coincident with the longitudinal axis of the carburetor and having heat storing refractory material therein at its base occupying a minor portion of the volume of the carburetor leaving the remaining major portion unobstructed throughout the horizontal cross-sectional area thereof, the superheater having a top inlet co-axial with the axis thereof and having checkerbrick therein defining a single pass for flow of gas therethrough, a stack leading from the base of the superheater and extending to a height greater than the height of the superheater, a backrun gas offtake leading from the base of the generator to a washbox, an uprun gas offtake leading from the stack to said washbox, a backrun steam inlet at the top of said stack, and means for controlling the flow through said offtakes.

CHARLES V. McINTIRE.
WILLIAM TIDDY.